United States Patent [19]

Watabe et al.

[11] Patent Number: 4,638,429
[45] Date of Patent: Jan. 20, 1987

[54] DATA PROCESSING APPARATUS FOR PROCESSING OPERAND STORE CONFLICT

[75] Inventors: Masaya Watabe; Shuichi Abe, both of Hadano, Japan

[73] Assignee: Hitachi, Ltd., Tokyo, Japan

[21] Appl. No.: 682,999

[22] Filed: Dec. 18, 1984

[30] Foreign Application Priority Data
Dec. 19, 1983 [JP] Japan ................... 58-239504

[51] Int. Cl.⁴ .................................... G06F 9/34
[52] U.S. Cl. ..................................... 364/200
[58] Field of Search ... 364/200 MS File, 900 MS File

[56] References Cited

U.S. PATENT DOCUMENTS 4,569,016 2/1986 Hao et al. ................... 364/200

Primary Examiner—Raulfe B. Zache
Attorney, Agent, or Firm—Antonelli, Terry & Wands

[57] ABSTRACT

In the data processing apparatus utilizing the pipeline control, an OSC detect circuit detects that the execution result of a store-type instruction whose store operation has not been completed is utilized as an operand of a fetch-type instruction which succeeds the store-type instruction. When the OSC detect circuit detects an OSC and a store operation of a preceding store-type instruction is executed, the data processing apparatus aligns the operand position with the operand fetched by the fetch-type instruction and merges the store operand.

7 Claims, 7 Drawing Figures

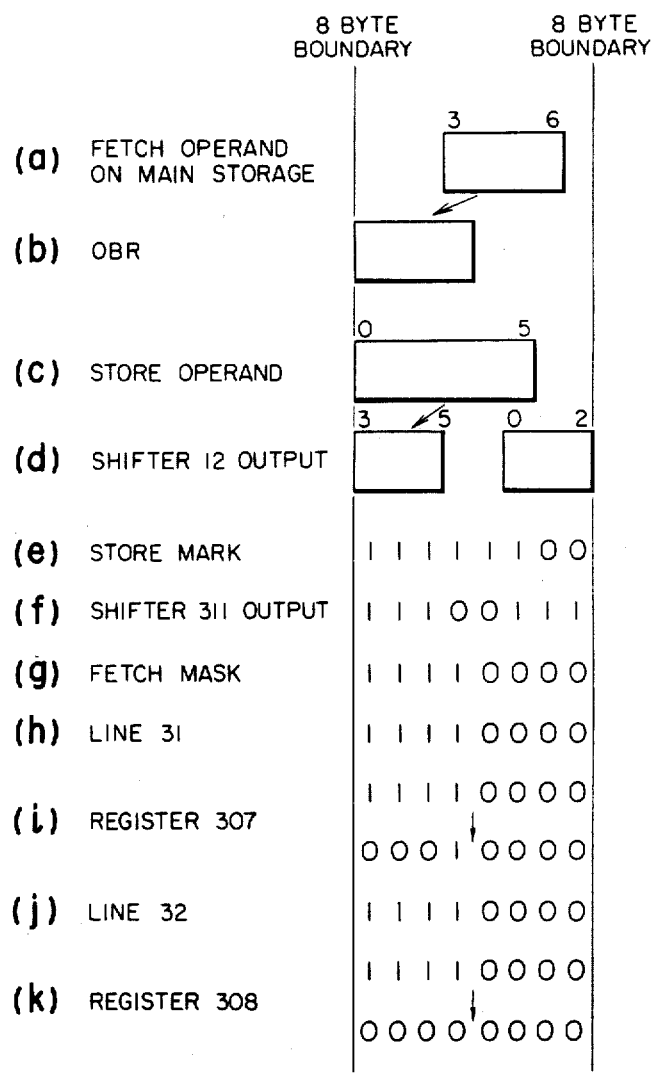

DATA PROCESSING APPARATUS FOR PROCESSING OPERAND STORE CONFLICT

The present invention relates to an information processing apparatus utilizing the pipeline control, and in particular, to an information processing apparatus utilizing the pipeline control and which processes conflict occurred between a store operation for storing an operand or operands in a storage by a preceding instruction and a fetch operation for fetching the operand or operands from the storage by a succeeding instruction.

In an information processing system utilizing the pipeline control, operation stages such as an instruction decode, an operand fetch, and an instruction execute processing are overlapped with respect to time between instructions. Consequently, an operand fetch operation of a succeeding instruction may take place before an operand store operation for storing the operand by a preceding instruction in some cases. In an information processing system for which the sequence for executing instructions is fixedly required, if an attempt is made by a succeeding instruction to fetch an operand from a memory area of a storage to be altered by a preceding instruction being executed or in the state waiting for its execution, this conflict between the fetch and alter operations is detected and the operand fetch operation of the succeeding instruction is delayed until the preceding instruction alters the data in the memory area, that is, the operand fetch operation must be executed only after the conflict is removed.

The state in which a succeeding instruction attempts to fetch an operand from a memory area whose content is to be altered by a preceding instruction being executed or waiting for its execution is generally referred to as Operand Store Conflict or Compare (OSC). If an operand fetch operation of the succeeding instruction is delayed until an OSC is resolved, the pipeline processing for instructions is disturbed and the processing performance is deteriorated.

The Japanese Patent Laid-Open Publication No. 161043/83 has disclosed an instruction control apparatus which allows a preceding instruction to start its operation before completion of a store operation for storing data in an associated storage by a preceding instruction by transferring an operand to be altered by the preceding instruction to the succeeding instruction without using the storage. In accordance with the Japanese Patent Laid-Open Publication No. 161043/83, only an instruction execution takes place for the store operation and a store operand of the instruction is passed to all prefetched succeeding instructions without using the storage. The store operand can be passed only when the address of the store operand contained in the preceding instruction completely matches that of the prefetched operand of the succeeding instruction.

It is therefore an object of the present invention to provide an information processing apparatus for transferring an operand to be modified by a preceding instruction to all succeeding prefetched instructions by aligning the operand position.

In the present invention, there is provided an OSC detect circuit for detecting that a succeeding instruction uses an operand to be modified by a preceding instruction whose store operation has not been completed. When an OSC is detected by the OSC detect circuit and a store operation is conducted by the preceding instruction, a control unit aligns the fetched operand to the operand position of the succeeding instruction and merges the operand accordingly.

The present invention will be apparent from the following detailed description taken in conjunction with the accompanying drawings, in which:

FIGS. 6A thru 6K are schematic diagrams for explaining operations of the present invention.

Figure 1:
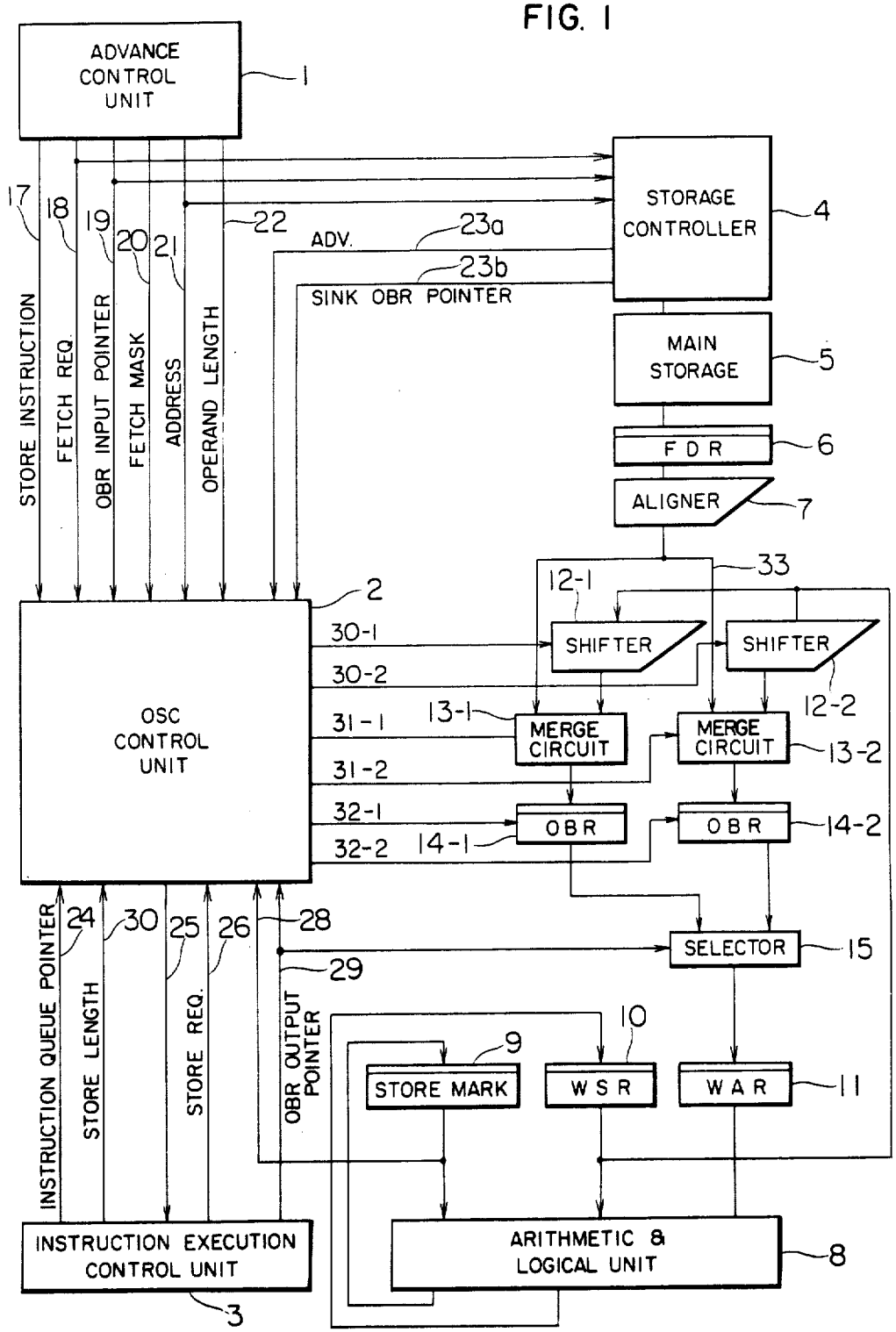
FIG. 1 is a schematic block diagram illustrating an embodiment of the present invention.

Referring to FIG. 1 depicting an embodiment of the present invention, there are shown only portions particularly related to the present invention.

Although an instruction is fetched from a storage 5 into an advance control unit 1, a route for transferring the instruction is not shown in FIG. 1. The advance control unit 1 issues an instruction fetch request together with an address to a storage controller 4 and holds the instruction fetched in reply to the request in an instruction buffer. The advance control unit 1 obtains an instruction from the instruction buffer and decodes it. If it is found that the decaded instruction is to fetch an operand from the storage, the address of the operand to be fetched is calculated and is passed to the storage controller 4 together with a fetch request. The fetch request and the address are delivered to signal lines 18 and 21 to be fed to the storage controller 4. In addition, the advnace control unit 1 delivers an operand buffer register (OBR) input pointer and a fetch mask to signal lines 19 and 20, respectively as will be described later in this specification. The OBR input pointer is fed to the storage controller 4 together with a fetch request and the other information. If the decoded instruction is to store an operand in the storage, a signal indicating that an instruction associated with a store operation has been decoded and an address is outputted to lines 17 and 21, respectively. For any instruction, an operand length is delivered to a signal line 22 as will be described later. The advance control unit 1 has a well known configuration.

For an instruction that fetches an operand from the storage; a data item is read from the main storage 5 and is stored in a fetch data register (FDR). In this embodiment, the FDR 6 is assumed to be 16 bytes wide. A 16-byte data item is read from the storage beginning from an eight-byte boundary into the FDR, and this data is aligned by the aligner 7 so that the first byte of the operand aligns to the left-most position, then the aligned data is fed to a data line 33. For a decimal instruction, however, since the processing is executed beginning from the least-significant digit, the data is required to be aligned so that the last byte of the operand is placed at the right-most position. This operation can be easily inferred from the former case, hence explanation thereabout will be omitted in the following paragraphs. When an operand is outputted from the main storage 5, the storage controller 4 delivers an advance signal and a sink OBR pointer to signal lines 23a and 23b, respectively. The sink OBR pointer is identical to an OBR input pointer supplied from a signal line 19 when a fetch request is issued.

A data item (an operand) fed to a data line 33 passes through a merge circuit 13-1 or 13-2 and is stored in an operand buffer register (OBR) 14-1 or 14-2 specified by a control (set) line 32-1 or 32-2. The OBR comprises a group of registers each for keeping the prefetched operand until the instruction is initiated to be executed. However, when an OSC occurs and if the store operation that has caused the OSC is completed before an operand is fetched to the data line 33, that is, the modified data is obtained from a work S-register (WSR) 10 storing an operation result and is transferred through shifters 12-1 and 12-2 and the merge circuits 13-1 and 13-2 to be stored at an appropriate position of the OBR 14-1 or 14-2, then a value is set to the data line by the merge circuits 13-1 and 13-2 excepting the byte position.

Before an execution of the instruction is started, the OBR 14-1 or 14-2 indicated by a control line 29 for indicating an OBR output pointer is selected by a selector 15 and is stored in a data register or work A-register (WAR) 11. That is, the WAR 11 is loaded with a fetch operand when the execution of an instruction is initiated in an arithmetic and logical unit 8. The operation result from the arithmetic and logical circuit 8 is stored in the WSR 10. In this embodiment, the WSR 10, WAR 11, and OBR 14-1 and 14-2 each is eight bytes wide. Although only two OBRs are shown in this example, if further more instructions are to be overlapped in the processing in the pipeline control system, the number of OBRs can be increased accordingly.

An instruction execution control unit 3 communicates signals with the advance control unit 1 and the OSC control unit 2 in order to control execution of an instruction in the arithmetic and logic unit 8. The instruction execution control unit 3 also has a well known configuration. A store operation for storing data in the storage is initiated when the instruction execution control unit 3 delivers a store request and a store address (not shown) through a signal line 26 to the storage controller. In this case, a byte indicated by a store mark register 9 is obtained from the WSR and is written in the main storage 5. The data path is not shown in FIG. 1. Each bit of the 8-bit wide store mark register 9 corresponds to each byte of the WSR 10. When a bit is "1", it is assumed that the data of the corresponding byte in the WSR 10 is stored in the main storage 6.

When an OSC occurs and an operation result is to be passed to a fetch operand of a succeeding instruction, the data stored in the WSR 10 is fed through the shifters 12-1, 12-2, merge circuits 13-1, 13-2, and OBRs 14-1, 14-2 and is stored at the corresponding byte location or locations in synchronism with an issuance of a store request 26 by a preceding instruction. The operation for transferring an operation result of a preceding instruction to a fetch operand of a succeeding instruction on an OSC occasion is referred to as memory operand wrap around or simply as operand wrap around. In this embodiment, a byte-unit operand wrap around can be conducted on a fetch operand of a succeeding instruction.

The operand wrap around is controlled by the OSC control unit and is indicated through pairs of control lines 30-1 and 30-2, 31-1 and 31-2, and 32-1 and 32-2. The advance control unit 1 controls processing which is to be conducted before an instruction execution and outputs control signals to control lines 17-22.

Next, the OSC control unit 2 will be described in detail by referring to FIGS. 2-4.

Figure 2:
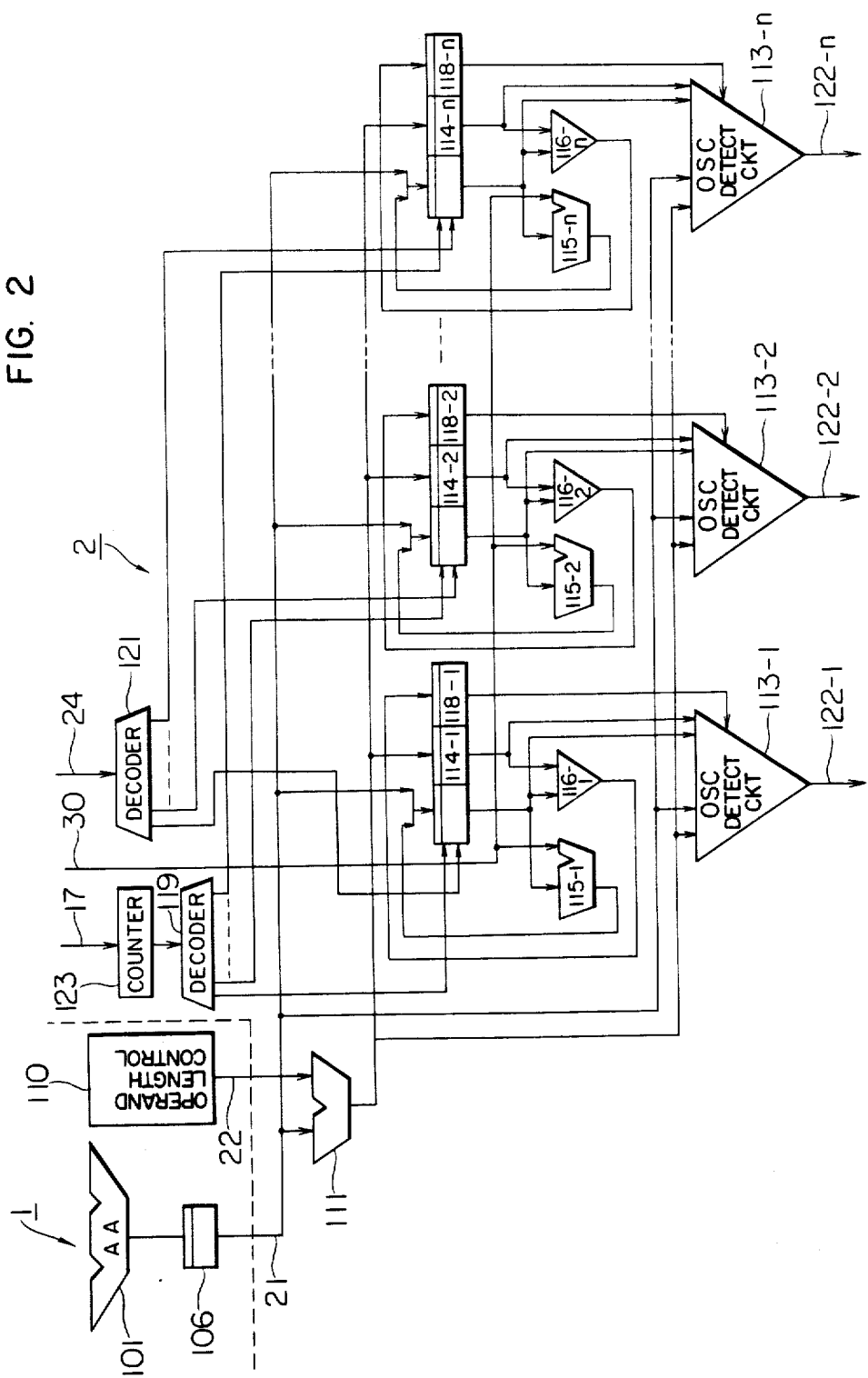
FIGS. 2 to 4 depict concrete examples of OSC control unit in accordance with the present invention.

FIG. 2 is a schematic diagram illustrating a portion of the OSC control unit 2 and which is mainly associated with the OSC detection. In FIG. 2, an address adder 101, an address register 106, and an operand length control unit 110 are contained in the advance control unit 1. The address adder 101 is utilized to calculate an oprand address (first address in general) of an instruction. The operand address is obtained, for instance, by adding an index value X, a base value B, and a displacement value D of an instruction, and the obtained operand address is stored in the address register 106 in synchronism with an instruction decode operation. A route for inputting an instruction is omitted in this schematic diagram.

An operand length adder 111 is provided to add the operand length of the operand to the operand address obtained by the address adder 101. The operand length to be added is determined in one of the following ways.

a. It is determined only from the operation code of an instruction.

b. It is directly specified by the operand length specification field.

c. It is determined in other than a and b above, for instance, it is loaded in a general-purpose register specified by a general-purpose register field of an instruction.

The operand length control circuit 110 controls to obtain the operand length in order to feed the operand length of an instruction to the operand length adder 111 in synchronism with a decode operation.

The first and last addresses of a store operand is held in n pairs of store address registers 114-1 to 114-n. The input is connected to the address register 106, the store length adders 115-1 to 115-n, and the operand adder 111, while the output is connected to the corresponding OSC detect circuits 113-1 to 113-n and store termination detect circuits 116-1 to 116-n. The correspondences between the store address registers 114-1 to 114-n and the first address (outputted from a register 106) and the last address (outputted from the operand length adder 111) of the store operand to be set thereto are specified by a counter 123 and a decoder 119. Each time an instruction associated with a store operation is decoded, the advance control unit 1 supplies a count-up signal to the counter 123 via the control line 17. The decoder 119 decodes the content of the counter 123 and delivers a set signal to one of the store address registers 14-1 to 14-n. That is, for each instruction associated with a store operation, the first and last addresses of the store operand respectively obtained as outputs from the register 106 and the operand length adder 111 are sequentially set to the store address registers beginning from the store address register 14-1.

There exists the one-to-one correspondence between the store length adder circuits 115-1 to 115-n and the store address registers 114-1 to 114-n. The inputs to the store length adder circuits 115-1 to 115-n include the first addresses of the store operands held in the associated store address registers 114-1 to 114-n and the store length delivered through a control line 30 from the instruction execution control unit 3 and which is actually used for an instruction execution. When the store operation is associated with a long operand and a plurality of 8-byte store operations are executed in reply to a plurality of store requests in an instruction, the store length is delivered to the control line 30 each time a store operation is executed. The store length adders 115-1 to 115-n are utilized to add the store address from the control line 30 to the first address from the respective store address registers 114-1 to 114-n and to deliver the resultant data to the corresponding store address registers. The pair of a store address register and a store length adder to be operated is indicated by a decoder 121. The decoder receives such data via a control line 24 (instruction queue pointer) from the instruction control unit 3 as information about the correspondence between an instruction executed and the associated store address register. Consequently, when an instruction containing a store operation is executed, the first address in the corresponding store address register is updated in the store length adder with the store length actually used in a store operation. That is, the storage area between the first address and the last address is gradually reduced each time a store operation is executed.

There exists the one-to-one correspondence between the store termination detect circuits 116-1 to 116-n and the store address registers 114-1 to 114-n. The inputs thereto includes the first and last addresses held in the associated store address registers, whereas the outputs therefrom are connected to flip-flops 118-1 to 118-n for holding validity bits corresponding to the respective store address registers.

Next, the operation of the circuit diagram of FIG. 2 will be described. The first and last addresses of an operand contained in an instruction which are calculated by use of the address adder 101, the operand length control circuit 110, and the operand length adder 111 are processed as follows depending on whether the operand is of a store type or of a fetch type.

When an instruction which alters the content of the storage area specifies an address of the storage area for the data alteration, the operand of the instruction is defined as a store-type operand including the cases in which the fetch and store operations are to be executed at the same time. On the other hand, an operand with which only the content of a storage area is referenced is referred to as fetch-type operand.

For a store-type operand, the first and last addresses of an operand calculated by the address register 106 and the operand adder 111 are sequentially stored in the store address registers 114-1 to 114-n so as to detect an OSC which may occur due to a fetch operation conducted by a subsequent instruction, and at the same time the validity bit (stored in flip-flops 118-1 to 118-n) of the pertinent store address register is set. Address registration is controlled by the counter which is updated in synchronism with an operation for decoding a store-type instruction. For a fetch-type operand, the addresses are not registered to the store address registers 114-1 to 114-n. The address of the fetch-type operand is fed to the OSC detect circuit and is used to detect an OSC. When an instruction being currently executed contains a store-type operand, a number assigned to a store address register to which this store operand belongs is specified from the instruction execution control unit 3 to the decoder 121 via the control line 24, and for each store request (a plurality of store requests may be issued depending on the instruction) issued to the main storage 5 during the execution of the instruction, the store length associated with the store operation is delivered to the control line 30. For each store request made after an instruction containing a store-type operand is initiated for its execution, the store length on the line 30 is added to the first address of the store operand in a store address register selected by the decoder 121 by use of the store length adder 115. The first and last addresses in the store address registers 114-1 to 114-n are compared with each other by the store termination detect circuits 116-1 to 116-n. If a matched pair is detected, the validity bit of the relevant store address register is reset. The event that the validity bit has been reset indicates that the content of the storage area for the store operand registered to the pertinent store register has been completely modified. Consequently, a store address register whose validity bit has been reset is ignored in the OSC detect operation for detecting OSC which may be caused due to a fetch operand of a succeeding instruction. This operation is carried out by controlling the operation of the OSC detect circuits 113-1 to 113-n in accordance with the store address registers 114-1 to 114-n. On the other hand, if the first and last addresses in the store address registers are unequal, the content of the storage area associated with an address of the store operand to be registered to the store address register has not been completely modified yet, hence the OSC detect operation is continued to detect an OSC due to a fetch operand address of a succeeding instruction with respect to the storage area associated with the update operation. As described above, each store address register 114-1 to 114-n properly holds the first and last addresses of a store operand indicating a storage area which has not been completely updated yet.

The OSC detect circuits 113-1 to 113-n are supplied with the first and last address of a store operand held in a store address register and the first and last addresses of a fetch operand respectively delivered from the address register 106 and the operand length adder 111. Each OSC detect circuit 113-1 to 113-n has four compare circuits and compares the first address of the store operation and that of the fetch operation, the first address of the store operation and the last address of the fetch operation, the last address of the store operation and the first address of the fetch operation, and the last address of the store operation and the last address of the fetch operation in order to identify the four states described hereinbelow. For these processing, only the OSC detect circuit corresponding to a store address register for which the validity bit is set carries out the pertinent operation.

(1) At least one byte of the fetch operand is overlapped with that of the store operand and the first addresses of these operands are found in the same 8-byte boundary.

(2) At least one byte of the fetch operand is overlapped with that of the store operand and the first address of the store operand is found in the 8-byte boundary immediately following the 8-byte boundary in which the first address of the fetch operand is found.

(3) At least one byte of the fetch operand is overlapped with that of the store operand but the other condition does not conform to (1) nor to (2) above.

(4) The condition does not conform to (1), (2), and (3) above.

The states (1), (2), and (3) each indicates that an OSC has occurred, whereas the state (4) does not indicate the occurrence of an OSC. In the states (1) and (2), the wrap around operation is possible for the store operand. The state (3) indicates that a store operation has not been conducted yet and that execution of a fetch-type instruction is prevented until the state (1) is set as the store operation is executed.

The detection results from an OSC detect circuits are delivered to the corresponding lines 122-1 to 122-n.

Figure 5A:
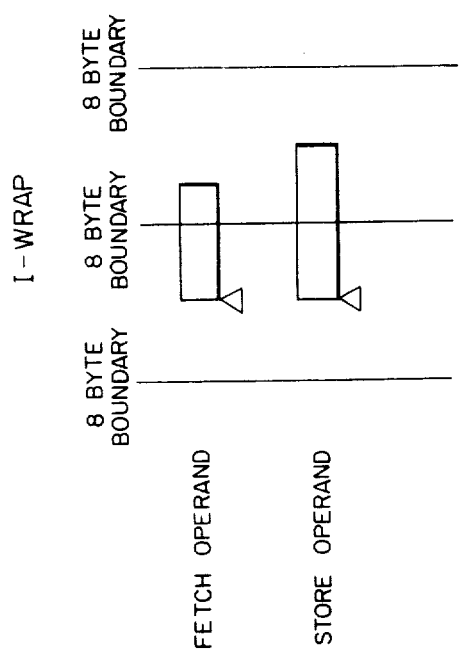
FIG. 5A and FIG. 5B illustrate relationships between fetch operands and store operands to be wrapped around.
Figure 5B:
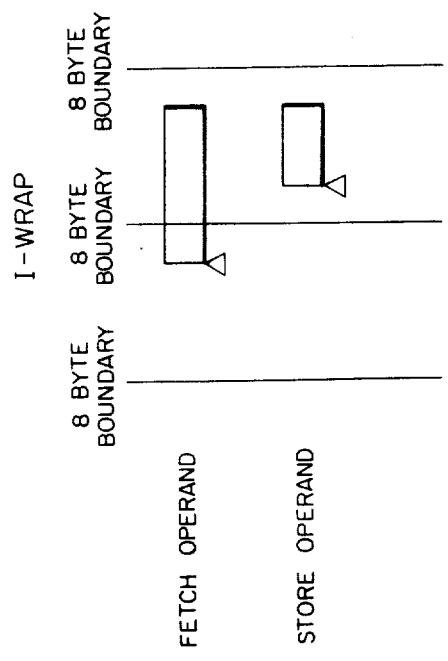

The states (1) to (3) are referred to as I-Wrap enable state, N-Wrap enable state, and Null state, respectively hereinafter. FIG. 5A and FIG. 5B depict the I-Wrap enable and N-Wrap enable states, respectively. The memory operand wrap arround is possible between an instruction associated with a store operation and an operand fetch operation of a succeeding instruction in the I-Wrap or N-Wrap enable states. The difference between these states results in the difference in the number of shift operation to be conducted to store the content of the WSR 10 in the OBR 14-1 or 14-2 after it is shifted a preset number of bytes.

Figure 3:
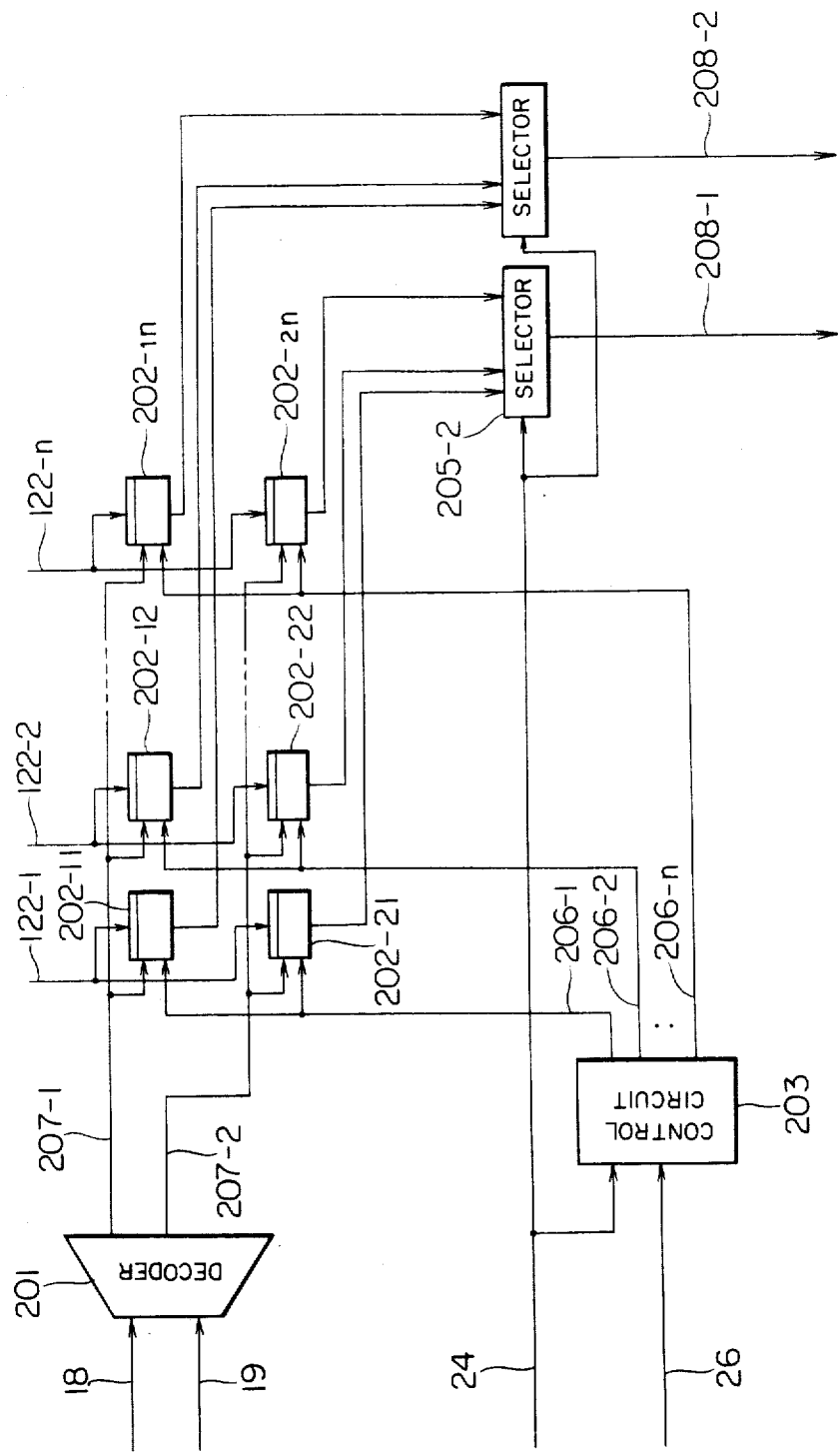

FIG. 3 depicts also a portion of the control circuit 2 which is mainly associated with the operation for holding the detection results from the OSC detect circuits 113-1 to 113-n shown in FIG. 2. In FIG. 3, a decoder 201 decodes the OBR input pointer on the OBR input pointer line 19 when operand fetch request line 18 supplies a signal set to "1", and the decoded data is delivered to control lines 207-1 to 207-n. The pointer line 19 indicates an OBR number of a OBR in which an operand fetched by the operand fetch request is to be stored. An OSC state hold latch group 202-ij ($1 \leq i \leq 2$, $1 \leq j \leq n$) is a set of latches for holding the OSC detection results. For the latch group 202-ij, the subscripts i and j correspond to the OBR 14-i and the store address register 114-j. The OSC state hold latch group 202-ij is used to register thereto the state indicated by an OSC detection result line 122-j in accordance with the control line 207-i.

The inputs to a control circuit 203 include the store request line 26 and the pointer line 24 as depicted in FIG. 2. The control circuit 203 controls the OSC state hold latch 202-ij through control lines 206-1 to 206-n. If an instruction being executed contains a store operation, the pointer line 24 indicates a register number of the corresponding store address register 114-j. If the pointer 24 indicates a value k when a store request is issued, the control circuit 203 outputs a signal to the line 206-k and stores the state indicated by the line 122-k in the latch 202-ik ($1 \leq i \leq k$). That is, the control circuit allows information about the new OSC state associated with the next store operation to be executed to be registered to the OSC state latch 202-ij in synchronism with completion of a store operation of the corresponding instruction.

When the pointer line 29 indicates a value k, selectors 205-1 and 205-2 select the latches 202-lk and 202-2k, respectively and deliver the pertinent data to control lines 208-1 and 208-2. If an instruction being executed in the arithmetic and logic circuit 8 contains a store operation, the control line 208 indicates the relationship with respect to the memory location between an operand of the next store operation to be executed and a fetch operand of the succeeding instruction to be stored in the OBR 14-1, that is, the I-Wrap enable, N-Wrap enable, or Null state. Similarly, the control line 208-2 also indicates the relationship of the fetch operand to be stored in the OBR 14-2.

Figure 4:
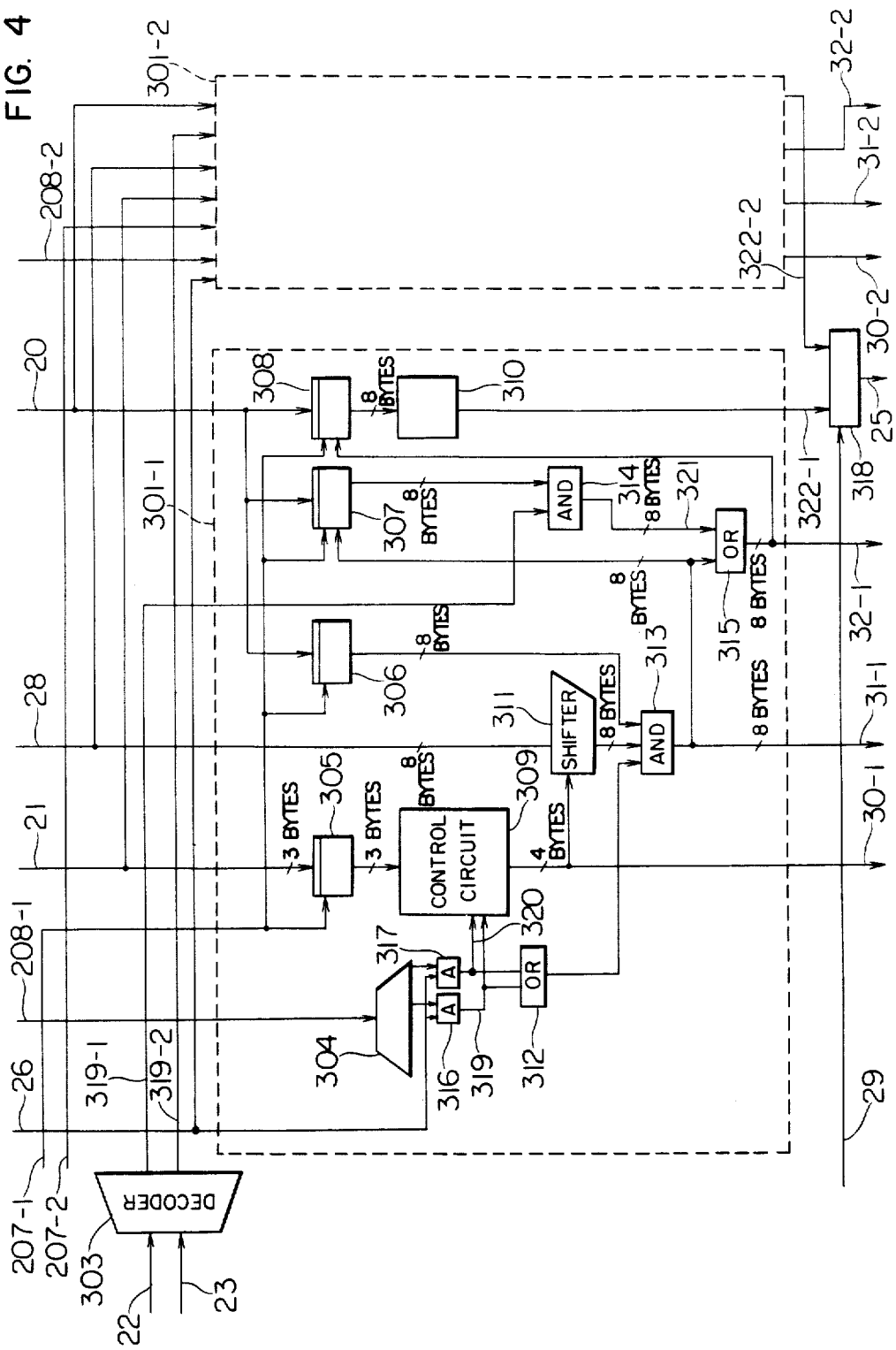

FIG. 4 is a schematic circuit block diagram depicting a portion of the OSC control unit which is mainly associated with the input control of the OBR 14-1 and OBR 14-2. Referring to FIG. 4, when the aadvance line 22 from the storage controller 4 indicates "1", a decoder 303 decodes a sink OBR pointer line 23 and outputs the decoded signals to control lines 319-1 and 319-2. The advance line 23 indicates that an operand has fetched from the main storage 5 and has been delivered to the data line 33. At the same time, an OBR number assigned to an OBR in which the operand is to be stored is supplied to the pointer line 23.

A control circuit 301-1 is provided to control the OBR 14-1, while a control circuit 301-2 is associated with control of the OBR 14-2. Since the control circuits 301-1 and 301-2 have the same configuration, details about the control circuit 301-2 are not shown in FIG. 4. The control circuit 301-1 will be described in the following paragraphs.

A register 305 comprises three bits and is loaded with data on the line 21 when the control line 207 from FIG. 3 indicates "1". As described by referring to FIG. 3, the control line 207-1 is set to "1" when an operand fetch operation for storing an operand in the OBR 14-1 is initiated. The line 21 indicates a value obtained from the first address of a fetch operand, that is, three low-order bits of the fetch address (to be referred to as align number hereinafter). The align number is also used to control the aligner 7 of FIG. 1. That is, the aligner 7 shifts the data fetched to the FDR 6 in the 8-byte boundary unit to the left in accordance with the align number in order to set the first byte of the operand to the left-most position.

Registers 306, 307, and 308 each comprises eight bits. When an operand fetch operation for storing an operand in the OBR 14-1, the 8-bit data on a fetch mask indicate line 20 is set to the registers 306, 307, and 308 under control of the control line 207-1. The data on the line 20 is supplied from the advance control unit 1 of FIG. 1. If a bit on the line 20 is "1", the corresponding byte in the fetch operand is necessary for the execution of the instruction. If it is "0", the byte is unnecessary for the instruction execution. This data is referred to as fetch mask hereinafter. For example, the fetch mask is set to "11110000" when it is desired to fetch four first-half bytes of the operand.

A decoder 304 decodes a signal from the control line 208-1 described in conjunction with FIG. 3. The inputs of an AND gate 316 include a decode output indicating the I-Wrap enable state and a store request line 26. The AND gate 316 delivers its output to the line 319. An AND gate 317 receives a decode output indicating the N-Wrap enable state and the store request 26 and supplies its output to a line 320. A control section 309 receives 3-bit data from the register 305 and outputs a 4-bit data item indicating the shift count of the shifter 12-1 to the control line 30-1 depending on the states of the lines 319 and 320.

When the control line 319 indicates "1" (I-Wrap), an operand wrap arround to the OBR 14-1 can be conducted on the all of or a part of the data for a store request issued at the same time. In this case, the operand stored in the WSR 10 is delivered sequentially through the shifter 12-1 controlled by the control line 30-1 and the merge circuit 13-1 controlled by the control line 31-1 and is set to the OBR 14-1 in accordance with the control signal 32-1. The operation associated with the state in which the control line 319 indicates "1" is also applicable to the case where the control line 320 is set to "1" (N-Wrap). The difference between these cases is that the control line 30-1 is supplied with four bits comprising a two's complement of the align number in the register 305 and "1" added to the first position in the former case (I-Wrap) and that it is supplied with four bits comprising the align number in the register 305 and "0" added to the first position in the latter case (N-Wrap). The first bit "0" indicates a shift to the left, while the first bit "1" means a shift to the right. By controlling the control line 301-1 with the control circuit 309 as described above, the data in the WSR 10 is aligned to the OBR 14-1 by the shifter 12-1 when an operand wrap around is executed. That is the output data from the shifter 12-1 and each byte of the OBR 14-1 correspond to the same address in the memory.

A shifter 311 shifts the store mark on a data line 28 in accordance with the control line 30-1. As described before, each bit of the store mark register corresponds to the respective byte of the WSR 10. Consequently, the shifter 311 shifts the data of the store mark register 9 when the data of WSR 10 is shifted by the shifter 12-1. An OR gate receives the control lines 312 and 319. An AND gate block 313 comprises eight AND gates for receiving the 8-bit output from the shifter 311, 8-bit output from the register 306, and output from the OR gate 312. That is, the AND gate block 313 delivers eight bits to the control line 31-1. If a bit on the control line 31-1 is "1", an output of the shifter is selected by use of the merge circuit 31-1 with respect to the corresponding byte, and at the same time, the corresponding bit on the control line 32-1 is indicated to be written in the OBR 14-1 as will be described later.

The output from the AND gate block 313 is supplied to the register 307. The fetch mask data is stored in the register 307. Any bit in the fetch mask data whose corresponding bit in the 8-bit output from the AND gate 313 is "1" is reset. Consequently, any bit of the register 307 for which the fetch mask is "1" with respect to the operand to be stored in the OBR 14-1 and of which the corresponding byte has not been written from the WSR 10 is set to "1". An AND gate group 314 comprises eight AND gates for receiving the control line 319 and each bit output from the register 307. An 8-bit control line 321 delivers the output from the AND gate 314. Each bit on the control line 321 corresponds to the respective byte of the OBR 14-1. When a bit on the control line 321 is "1", the data fetched and aligned is indicated to be set to the associated byte on the data line 33. An OR gate group 315 comprises eight OR gates for receiving the 8-bit control lines 31-1 and 321. As illustrated in FIG. 1, the control line 32-1 which delivers the output from the OR gate group 315 sets the OBR 14-1. The control line 32-1 comprises eight bits respectively corresponding to the bytes of the OBR 14-1.

In FIG. 1, the merge circuit 13-1 selects the output data from the shifter 12-1 for each byte corresponding to the respective bit on the control line 31-1 when the control line 31-1 indicates "1". It selects the output data on the data line 33 from the aligner 7 when the control line 31-1 indicates "0". These operations allow to merge the operation result of a preceding instruction associated with a store operation with data fetched from the memory in byte units and to store the resultant data in the OBR 14-1.

For example, when the bit k (0≦k≦7) on the control line 31-1 is "1", the bit k on the control line 32-1 is also set to "1", and a 1-byte data selected from the content of the WSR 10 and which is to be shifted to the byte position k by the shifter is set to the byte position k in the OBR 14-1. If the bit k on the control line 31-1 is "0" and the bit k on the control line 321 is "1", the bit k on the control line 32-1 is also set to "1", and the relevant byte of the data fetched from the main storage 5 is set to the byte position k in the OBR 12-1. When the bit k on the control line 31-1 and the bit k on the control line 321 are both "0", no action takes place on the byte k in the OBR 14-1.

Returning now to FIG. 4 again, the content of the register 308 is reset bit by bit corresponding to the bits "0" on the control line 32-1. That is, a bit is set to "0" if it corresponds to a byte for which data is set to the OBR 14-1 by the FDR 6 or WSR 10 as shown in FIG. 1. An all 0 detect circuit 310 is utilized to detect a state in which the content of the register 308 is "00000000" and to deliver its output to a control line 322-1. A selector 318 selects the control line 322-1 or 322-2 according to the OBR output pointer line 29. The content on the line 29 is supplied from the instruction execution control unit 3 of FIG. 1 and indicates an OBR number of an OBR in which an operand necessary for the next instruction to be executed is stored. A control line 25 delivering an output from the selector 318 is connected to the instruction execution control unit 3. The control line 25 indicates that all operands of the next instruction to be executed has been loaded in an OBR indicated by the control line 29. When the control line 25 is "1", the instruction execution control unit 3 can fetch the operands from the OBR indicated by the OBR output pointer line 29 into the WAR 11 in order to initiate execution of the next instruction.

Next, a concrete example of an operand wrap around operation centered on the operation of FIG. 4 will be described by referring to FIG. 6.

Referring to FIG. 6, (a) indicates an operand to be fetched in the main storage. This is a 4-byte operand located at byte positions 3-6. The operand is shifted three bits to the left by the aligner 7 so that the first bit thereof is aligned to the leftmost bit position of the OBR as depicted in (b). Consequently, the fetch mask of (g) to be supplied to the line 20 becomes "11110000". On the other hand, the store operand of (c) comprises six bytes located at byte positions 0-5 and which exists in the same 8-byte boundary as the fetch operand. Consequently, the store mark to be supplied on the line 28 becomes "11111100" as illustrated in (e). This indicates the I-Wrap enable state, so the control section 309 outputs four bits "1101" to the line 309. Since the first bit "1" means the I-Wrap case, it is required to cause the shifter 12 (FIG. 1) to execute a cyclic shift operation to the right on the store operand, and the data "101" at bit positions 1-3 is a two's complement of three low-order bits "011" of the fetch operand address and indicates to execute a 5-bit shift operation. Blocks of (d) indicate the store operand obtained by executing the 5-bit shift operation to the right in the shifter 12. Similarly, the store mark also undergoes the 5-bit shift operation to the right in the shifter 12 and the resultant data is obtained as "11100111" shown in (f). The AND gate 313 delivers an output reflecting the ANDed result of the data items of (f) and (g), that is, "11100000" as depicted in (h). This data is supplied to the merge circuit 13-1 and indicates that the three bytes in the left portion of data outputted from the shifter 12 are to be set to the OBR. As can be seen from (a) and (b), three bytes in the left portion of the OBR exist at byte positions 3-5 in an 8-byte boundary. That is, the byte position has been aligned by the shifter 12.

The content of the register 307 is the same as the initial fetch mask of (g) as depicted in (i), and the bits of the register 307 whose corresponding bits on the line 31-1 delivering the output from the AND gate 313 are "1" are reset, that is, "00010000" is obtained. Consequently, the output (on the line 32-1) from the OR gate 315 becomes "11110000" as illustrated in (j), and the data is set to the four first-half bytes of the OBR. As shown in (k), the content of the register 308 is the same as the initial fetch mask of (g), and the bits of the register 308 whose corresponding bits on the line 32-1 delivering the output from the OR gate 315 are "1" are reset and the all "0" state results. This means that the wrap around of the fetch and store operands with respect to the OBR has been completed and that an instruction associated with a fetch operation is allowed to be started.

In accordance with the embodiments described hereinbefore, all the data fetched from the main storage 5 is temporarily stored in the OBR 14-1 or 14-2, and the associated data is fetched and loaded in the WAR 11 prior to execution of an instruction. The object of the present invention is therefore achieved by disposing a data path for transferring the store data stored in the WSR 10 to the OBR 14. In other information processing apparatus, on the other hand, the data fetched from the memory can be set to the WAR 11 after it is stored in the OBRs 14-1 and 14-2 or can be directly stored in the WAR 11. However, in addition to the path for transferring the data stored in the WSR 10 to the OBRs 14-1 and 14-2, a data path is required to transfer the data to the WAR 11. This data path can be easily thought of based on the present invention.

In accordance with the present invention, an operand is fetched from a memory and is held prior to execution of an instruction, and if the operand fetched from the memory is to be modified in the memory by a preceding store instruction during a period of time between when the operand is fetched and when execution of the succeeding instruction is started, the modified data can be merged, for example, in the byte unit into said fetch operand held in advance in synchronism with the store operation.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

We claim:

1. A data processing apparatus for processing a store-type instruction which stores an operand as a result of an instruction execution in a storage location of a storage and a fetch-type instruction which fetches an operand from a storage location, comprsing:
   a detecting means for detecting that an execution result of said store-type instruction for which a store operation has not been completed is utilized as an operand of said fetch-type instruction which succeeds said store-type instruction; and
   a control means for aligning an operand position with the operand fetched by said fetch-type instruction and for merging an store operand in response to a detection by said detecting means and a store operation for storing said execution result.

2. A data processing apparatus according to claim 1 wherein said detecting means includes a detect circuit which operates based on the first and last addresses of an operand for which a store operation has not been completed by said store-type instruction and the first and last address of an operand contained in said fetch-type instruction for detecting an overlap between the operands.

3. A data processing apparatus according to claim 1 wherein said detecting means includes:
   a plurality of register means for storing first and last addresses of operands for said store-type instructions for which store operation has not been completed; and
   a plurality of OSC detect circuits associated with each said register means for detecting an OSC based on said address held in the associated register means and the first and last address of an operand of a fetch-type instruction which succeeds said store-type instructions.

4. A data processing apparatus according to claim 3 wherein said detecting means further includes:
   update means for updating said first addresses held in said register means associated with said store-type instructions for which the store operation is executed each time the store operation is executed; and
   invalidate means for invalidating the addresses held in said register means when the first and last address each held in the respective register means becomes equal to each other.

5. A data processing apparatus according to claim 3 further comprising arithmetic and logical means for executing an operation specified by said instruction wherein said control means includes:
   a plurality of operand buffer registers for holding the operands fetched by different said fetch-type instructions from said storage until said operands are executed by said arithmetic and logical means; and
   a plurality of merge means for merging a result from execution of said store-type instruction in said arithmetic and logical means into said operand buffer register in response to a detection by said detecting means by aligning the result to the operand position held in said operand buffer register.

6. A data processing apparatus according to claim 5 wherein said merge means includes a plurality of shift means each associated with each said operand buffer register for aligning said execution result to a fetched operand position held in said operand buffer register on which a merge operation is to be executed.

7. A data processing apparatus according to claim 6 wherein said control means further comprises:
   a plurality of latch means for latching detection results from said plurality of OSC detect circuits corresponding to said plurality of operand buffer registers, said latch means provided for latching said plurality of detection results in said latch means associated with said operand buffer registers to which operands are set in response to a fetch request to said storage by said fetch-type instruction, and said latch means provided further for outputting said detection results associated with said store-type instruction which executes said store operation in response to said store operation; and
   means disposed in association with said operand buffer registers for controlling said merge means and said operand buffer register based on the detection result from said latch means, information about said store operands, and information about said fetch operands.

* * * * *